United States Patent [19]

Romano et al.

[11] Patent Number: 5,576,910
[45] Date of Patent: Nov. 19, 1996

[54] BURST COMPARISON AND SEQUENTIAL TECHNIQUE FOR DETERMINING SERVO CONTROL IN A MASS STORAGE DISK DEVICE

[75] Inventors: Paul M. Romano; Larry D. King; Mike Machado, all of Boulder, Colo.; Petro Estakhri, Pleasanton; Son Ho, Sunnyvale, both of Calif.; Phuc Tran; Maryam Imam, both of Fremont, Calif.

[73] Assignee: Cirrus Logic, Inc., Fremont, Calif.

[21] Appl. No.: 441,676

[22] Filed: May 15, 1995

Related U.S. Application Data

[63] Continuation of Ser. No. 71,472, Jun. 4, 1993, abandoned.

[51] Int. Cl.$^6$ ........................................... G11B 5/596
[52] U.S. Cl. ............................... 360/77.08; 360/78.14
[58] Field of Search .......................... 360/77.08, 77.02, 360/78.14, 77.07, 77.05

[56] References Cited

U.S. PATENT DOCUMENTS

| | | | |
|---|---|---|---|
| 4,133,011 | 1/1979 | Kurzweil, Jr. | 360/78.09 |
| 4,514,667 | 4/1985 | Sakmann et al. | 318/254 |
| 4,544,968 | 10/1985 | Anderson et al. | 360/78.06 |
| 4,564,794 | 1/1986 | Kilen et al. | 388/813 |
| 4,575,776 | 3/1986 | Stephens et al. | 360/78.09 |
| 4,578,723 | 3/1986 | Betts et al. | 360/77.08 |
| 4,590,526 | 5/1986 | Laatt et al. | 360/78.14 |
| 4,594,622 | 6/1986 | Wallace | 360/77.04 |
| 4,598,327 | 7/1986 | Jen et al. | 360/77.07 |
| 4,616,276 | 10/1986 | Workman | 360/77.04 |
| 4,658,308 | 4/1987 | Sander, Jr. | 360/74.1 |
| 4,669,004 | 5/1987 | Moon et al. | 360/53 |
| 4,679,102 | 7/1987 | Wevers et al. | 360/75 |
| 4,679,103 | 7/1987 | Workman | 360/78.07 |
| 4,691,152 | 9/1987 | Ell et al. | 318/516 |
| 4,697,127 | 9/1987 | Stich et al. | 318/561 |
| 4,812,929 | 3/1989 | Stewart et al. | 360/77.07 |
| 4,816,941 | 3/1989 | Edel et al. | 360/78.17 |
| 4,831,469 | 5/1989 | Hanson et al. | 360/75 |
| 4,831,470 | 5/1989 | Brunnett et al. | 360/75 |
| 4,835,632 | 5/1989 | Shih et al. | 360/78.04 |
| 4,835,633 | 5/1989 | Edel et al. | 360/78.12 |
| 4,864,434 | 9/1989 | Janz | 360/55 |
| 4,876,491 | 10/1989 | Squires et al. | 318/138 |
| 4,894,599 | 1/1990 | Ottesen et al. | 318/636 |
| 4,896,240 | 1/1990 | Moriya et al. | 360/77.08 X |
| 4,914,644 | 4/1990 | Chen et al. | 369/43 |
| 4,922,169 | 5/1990 | Freeman | 318/254 |

(List continued on next page.)

*Primary Examiner*—Aristotelis Psitos
*Assistant Examiner*—James T. Wilson
*Attorney, Agent, or Firm*—John R. Ley

[57] ABSTRACT

A burst magnitude comparator and an instruction sequencer are employed in a servo system controller to rapidly determine position correction information for moving a transducer head over the center line of a track recorded on a disk in a mass storage disk drive. The burst magnitude comparator selects at least two burst signals derived from bursts recorded at predetermined locations relative to the center line from which to derive a correction control signal, based on a predetermined relationship of the burst signals, and supplies the selected burst signals in a predetermined order to facilitate calculation of the correction signal by a data processor used with the servo system controller. An instruction sequencer controls a sequence of converting the analog burst signals from the head to digital burst signals without intervention or control from the data processor. By ordering the signals with the burst magnitude comparator and by sequencing the conversion of the signals, the calculation is speeded and the processing and code requirements for the data processor are greatly reduced, thereby reducing transport delay and freeing the resources of the processor for use in other, potentially more important tasks associated with the servo controller.

24 Claims, 3 Drawing Sheets

U.S. PATENT DOCUMENTS

| | | | |
|---|---|---|---|
| 4,924,160 | 5/1990 | Tung | 318/561 |
| 4,928,043 | 5/1990 | Plunkett | 318/254 |
| 4,933,786 | 6/1990 | Wilson | 360/78.14 |
| 4,933,795 | 6/1990 | Nigam | 360/121 |
| 4,937,689 | 7/1990 | Seaver et al. | 360/78.02 |
| 4,967,291 | 10/1990 | Touchton et al. | 360/78.04 |
| 4,979,055 | 12/1990 | Squires et al. | 360/69 |
| 4,979,056 | 12/1990 | Squires et al. | 360/69 |
| 4,985,793 | 1/1991 | Anderson | 360/105 |
| 4,992,710 | 2/1991 | Cassat | 318/254 |
| 5,001,405 | 3/1991 | Cassat | 318/254 |
| 5,028,852 | 7/1991 | Dunfield | 318/254 |
| 5,057,753 | 12/1991 | Leuthold et al. | 318/254 |
| 5,136,561 | 8/1992 | Goker | 360/78.04 X |
| 5,170,299 | 12/1992 | Moon | 360/77.08 |
| 5,187,619 | 2/1993 | Sidman | 360/77.08 |
| 5,255,136 | 10/1993 | Machado et al. | 360/77.02 |

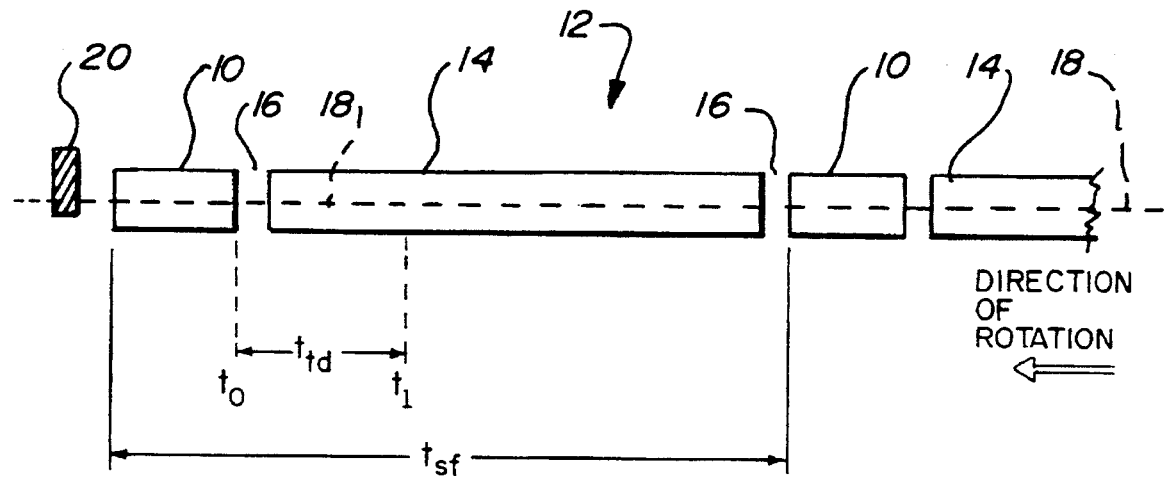
Fig_1
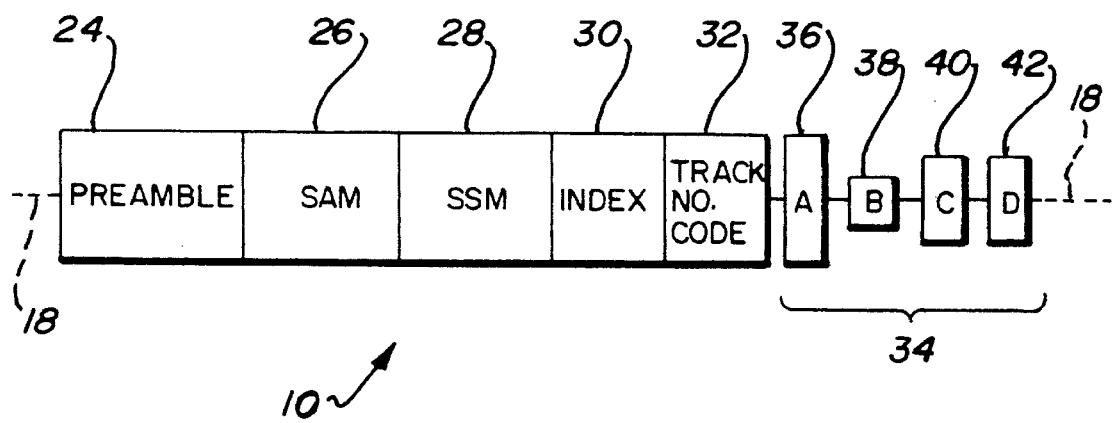
Fig_2

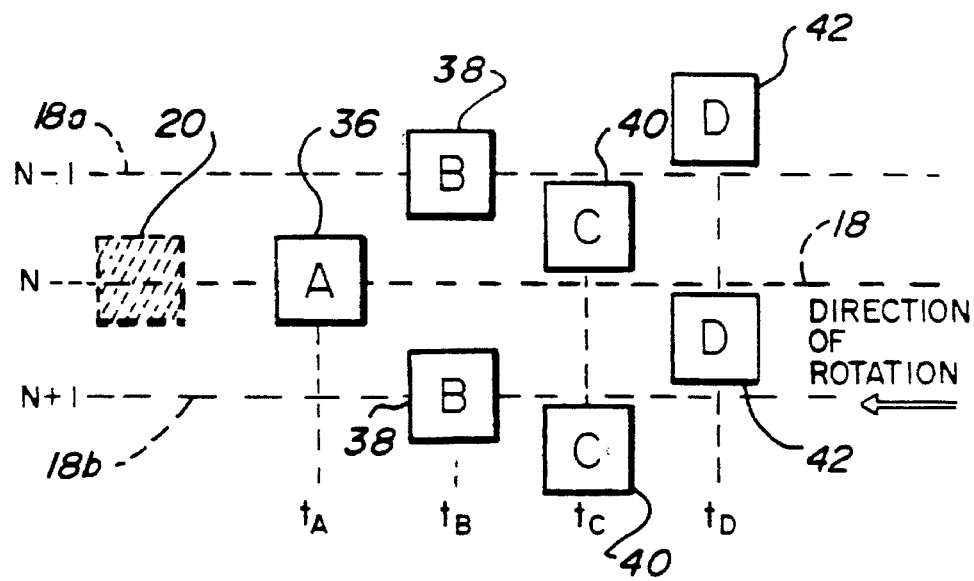
Fig_3
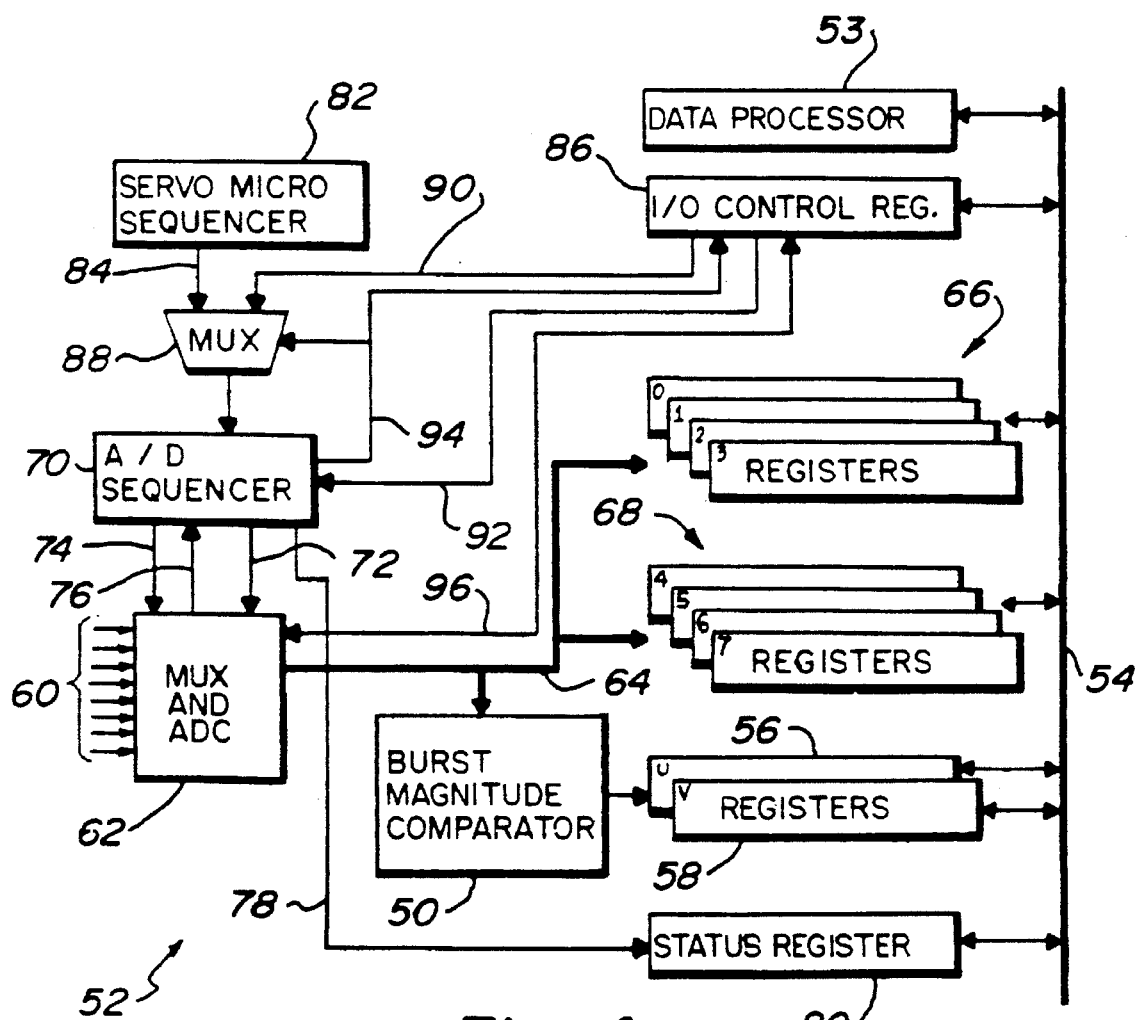
Fig_4

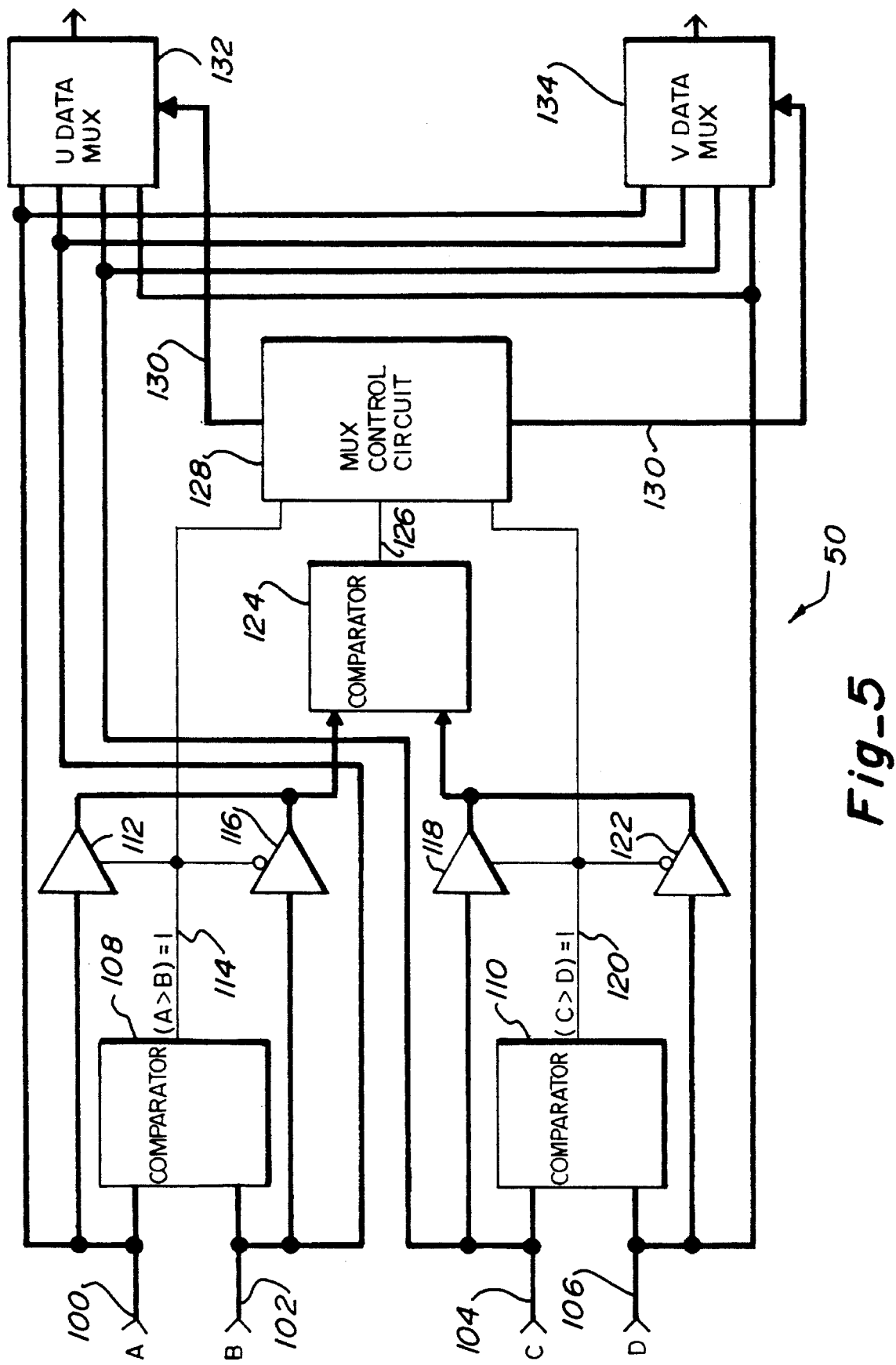
Fig_5

BURST COMPARISON AND SEQUENTIAL TECHNIQUE FOR DETERMINING SERVO CONTROL IN A MASS STORAGE DISK DEVICE

This is a continuation of a U.S. patent application for "Burst Comparison And Sequential Technique For Determining Servo Control In A Mass Storage Disk Drive Device," Ser. No. 0/071,472, Filed Jun. 4, 1993 now abandoned.

This invention relates to computer mass storage devices having rotating computer disks with servo field control information recorded on the disk, and more particularly to a new and improved technique for reducing transport delay in a disk drive system. Even more particularly, the present invention relates to a new and improved technique for efficiently converting analog off-track bursts from a servo field recorded on the disk into position control information for maintaining a read write head or transducer over a center line of a track of information recorded on the disk, to minimize transport delay and to minimize the amount of information processing required.

CROSS-REFERENCE TO RELATED APPLICATION

The present invention is related to those described in U.S. patent applications Ser. No. 08/071,773 for filed concurrently herewith; and Ser. No. 08/072,135 for SEQUENCE, TIMING AND SYNCHRONIZATION TECHNIQUE FOR SERVO SYSTEM CONTROLLER OF A COMPUTER DISK MASS STORAGE DEVICE, filed concurrently herewith. These related applications are assigned to the assignee hereof. These related applications are incorporated herein by this reference.

BACKGROUND OF THE INVENTION

Disk drive computer mass storage devices comprise a randomly accessible rotating storage medium, or disk, on which information is encoded or written by various means. In magnetic disk drives, the information is encoded as characters or dibits formed by magnetic field reversals or transitions recorded on the magnetically-hard surface of the rotating disk. The dibits of information are arranged in concentric rings called tracks. A transducer or read write "head" is positioned over the tracks to read the dibits from the tracks or to write new dibits to the tracks.

The read write head is mounted on an actuator arm which is attached to a voice coil motor ("VCM"). The VCM moves the head and actuator arm across the disk surface at very high speeds to perform seek operations in which the head is positioned over a selected track. The VCM also maintains the head over a selected track while reading or writing information. A servo system controller is the general term used to describe that portion of the disk drive which is responsible for achieving all of the functionality necessary for reading and writing information in response to requests from a computer to which the disk drive is connected for information storage purposes.

Along each track, the dibits are arranged linearly about a center line of the track. The dibit information is usually organized into sectors or fields of predetermined length along each track. A field of data information is usually preceded by a field of control information that may be used to verify the position of the head before read or write operations. The data information fields may also include an error correction code which aids in correcting errors that may occur when information is read.

In embedded servo disk drives position verification and control information is contained in a servo field which is recorded in the tracks at the time of manufacture of the disk by using a high precision servo writer or by other well known techniques. The servo field information is used to perform continuous on-track positioning of the head with respect to a center line of the track by reading and responding to the control information contained within the servo fields. The servo fields are interspersed with data fields in which data information is recorded.

The control information imbedded in the embedded servo field typically includes a preamble which delimits the beginning of a servo field, a servo address mark ("SAM") which indicates that a valid servo field has been detected, a servo synch mark ("SSM") which is used to establish and maintain synchronization over reading and writing operations, an index mark which indicates a single reference point common to all the tracks or a band of tracks on the disk, and a track number code which is a Gray coded integer value of the track currently spanned by the read write head.

The embedded servo field also typically includes off-track burst information which is written on the track when the disk drive is manufactured. The off-track bursts, which comprise dibits, are physically positioned at precise intervals and locations with respect to the track center line to provide the servo system controller with information relative to the fractional track to track displacement of the head with respect to the track center line. This positional information is generated by the head reading the off-track bursts and supplying signals having magnitudes related to the bursts read. Typically there are four off-track bursts, and the information obtained by reading the bursts is sometimes referred to as quadrature signals, quadrature information or quadrature data. In the typical disk drive the quadrature data is utilized by a data processor associated with the servo system controller to generate, calculate and provide control signals to the VCM to position the head over the track center line.

Disk drives which do not embed the servo field control information in the tracks along with the data fields of data information, usually have multiple disks or disk recording surfaces. A head moves over each recording surface, and all of the heads are ganged together for movement in unison. One of the recording surfaces contains only the servo control information which is read to control the position of ganged heads over all of the tracks. The servo control information may include off-track bursts.

It can be very difficult to maintain the head precisely located on the track center line, due to such adverse influences as rotary perturbations, run-out, vibrations, movements of the disk drive forming a part of a computer subsystem (a significant effect with portable computers) or the like. If the head is not maintained at a position located on the center line of the track, it is more likely that reading and writing errors could occur. It is therefore one of the primary functions of the servo system controller to position and maintain the heads over the track center line to obtain the best performance under reading and writing operations.

The term transport delay generally refers to the amount of time which is required by the servo system controller to detect a significant off-track condition and correct the error. Because of the inertia and other finite delay aspects of moving the mechanical elements of head, actuator arm and the VCM, as well as the time delay inherent in control feedback loops to recognize the error, calculate the magnitude of the error and establish control signals adequate to correct for the error, and other factors, transport delay is an important qualification regarding the performance of a disk drive. Due to the trend toward increased disk rotational speeds and increased dibit and track-to-track density to reduce seek times and latency, transport delay can have a significant impact on data throughput or "bandwidth" performance of the disk drive. Longer transport delays result in lower bandwidth of the disk drive, because more time is required to detect and calculate corrections to effect the position of the head and actuator.

SUMMARY OF THE INVENTION

One of the features of the present invention is to provide a disk drive servo system controller which reduces transport delay in controlling the position of a read write head relative to the center line of a track in a disk drive, such that more continuous tracking of the track center line will be obtained. Another feature is to implement this technique in a more hardware-efficient and a less data processing-resource dependent manner which frees a data processor associated with the servo system controller to accomplish other potentially more important or time sensitive tasks. A further feature of the invention is to control the sequencing and conversion associated with the signals from the head in a manner which is independent of and does not require the processing resources of the data processor. This independent control of the sequencing and conversion also relieves the data processor of control over this functionality, thereby freeing its resources for other tasks. The features of the present invention are advantageously integrated into a servo system controller for use with or containing its own data processor.

In accordance with these and other features, the present invention relates to an off-track burst magnitude comparator of a servo system controller for a disk drive. The disk drive has a rotating mass storage disk with information tracks recorded on the disk. A transducer head is selectively moveable with respect to the tracks to perform read and write operations. At least one of the tracks includes a servo field which contains a predetermined number of off-track bursts. The off-track bursts are each recorded at a predetermined location with respect to a center line of the track by which to derive corresponding burst signals that have magnitudes which are indicative of the position of the head relative to the track center line. A read write channel receives signals from the head and supplies the signals to the servo system controller. The burst magnitude comparator is responsive to the burst signals and selects at least two of the burst signals based on a predetermined relationship of the burst signals and supplies the selected burst signals in a predetermined order to facilitate calculation of a correction signal to use in moving the head toward the track center line. Preferably a data processor performs a mathematical calculation, such as a simple subtraction, on the two selected signals to obtain the correction signal. By the burst magnitude comparator selecting, ordering and supplying the signals, the processing requirements and code required by for deriving the correction signal are greatly simplified, thus speeding the calculation and reducing the transport delay while freeing the data processor for use in other tasks.

Preferably the off-track bursts recorded on the disk are four quadrature bursts. The quadrature bursts include an A burst recorded on the center of the track center line, a B burst which is recorded on the center of an adjacent track center line, a C burst which is recorded to one side of the track center line toward a lesser numbered adjacent track and a D burst recorded on the other side of the track center line toward a greater numbered adjacent track. The burst magnitude comparator selects the signals derived from the C and the D bursts as the selected burst signals if either one of the signals derived from the A or the B bursts is the largest of all of the burst signals. The burst magnitude comparator selects the signals derived from the A and the B bursts as the selected burst signals if either one of the signals derived from the C or the D bursts is the largest of all of the burst signals. The burst magnitude comparator orders the signal derived from the D burst to be subtracted from the signal derived from the C burst when the signal derived from the A burst is the largest of all of the burst signals, and orders the signal derived from the C burst to be subtracted from the signal derived from the D burst when the signal derived from the B burst is the largest of all of the burst signals. The burst magnitude comparator orders the signal derived from the A burst to be subtracted from the signal derived from the B burst when the signal derived from the C burst is the largest of all of the burst signals, and orders the signal derived from the B burst to be subtracted from the signal derived from the A burst when the signal derived from the D burst is the largest of all of the burst signals. By ordering the signals in this manner, a mathematical subtraction will result in the sign of the result indicating the direction of movement to obtain center line positioning, and the magnitude of the subtraction of the C and D burst signals is linearly related to a degree of fine positioning control. The burst magnitude comparator achieves this functionality automatically without supervision, intervention or control from the data processor.

In accordance with still other features, the present invention relates to a sequential technique of converting analog servo control signals detected by the head to digital form, for use in position control and for other control purposes. The servo system controller includes an analog to digital converter (ADC) receptive of the analog signals and operative to convert the analog signals to digital signals, a servo sequencer operative to execute servo instructions, and a data processor operative to perform control functions for the servo system controller in addition to the calculation of the correction signal. The ADC is selectively controllable by either the servo sequencer or the data processor. For example, the control of the ADC may be from the servo sequencer during conversion of the off-track burst signals and may be from the data processor during conversion of analog signals other than the off-track burst signals. Either the servo sequencer or the data processor may convert all of the signals, if desired. An analog to digital sequencer (A/D sequencer) controls the ADC to convert each of the off-track signals in order. The A/D sequencer is controlled by the execution of servo instructions by the servo sequencer. A read write channel may place the servo control information signals from the head in parallel order, and a multiplexer is operative in response to channel select signals from the A/D sequencer to select ones of the parallel signals from the read write channel for application to the ADC. Use of the servo sequencer and ADC allows these functions to be performed in order without supervision, interruption, intervention or control from the data processor to enhance the responsiveness of the servo system controller.

The above mentioned and other features and objects of the present invention and the manner of attaining them will become more apparent, and the invention itself will be best understood, by reference to the following detailed description of the invention taken in conjunction with the accompanying drawing.

BRIEF DESCRIPTION OF THE DRAWINGS

FIG. 1 is a simplified illustration of the organization of alternating servo control information and data information fields, or sectors, disposed along a track center line of a disk drive and schematically illustrating a read write head displaced slightly off-track prior to the arrival of a servo data field beneath it.

FIG. 2 is a simplified illustration of a typical servo field shown in FIG. 1 showing preamble, SAM, SSM, index mark and track number code portions thereof as well as off-track bursts for providing fractional off-track servo control information.

FIG. 3 is a simplified and enlarged illustration of a read write head (shown in phantom) along a track center line prior to the off-track servo bursts shown in FIG. 2 passing underneath the head due to the rotation of the disk.

FIG. 4 is a functional logic block diagram of a portion of a servo system controller embodying the present invention.

FIG. 5 is a functional logic block diagram of a burst magnitude comparator of the servo system controller shown in FIG. 4.

DETAILED DESCRIPTION

The features of the present invention interact with and respond to the servo control information contained in a servo field 10 which is embedded or otherwise present in a track 12, as shown in FIG. 1. A plurality of servo fields 10 are located along the track 12, interspersed with a plurality of data fields 14 as shown. The pattern of a servo field 10 and a data field 14 repeats in the direction of rotation of the disk, with the preceding servo field 10 usually being associated with the following data field 14. The adjacent servo fields 10 and data fields 14 may be separated by gaps or transitions 16 as shown, or they may be contiguous to one another and have no transitions delimiting the field boundaries (a situation which is not shown in FIG. 1).

The servo fields 10 and data fields 14 lie along a track center line 18. The dibits which define the information on the track are located linearly along the center line 18. The magnetic reversal or the absence of a magnetic reversal at each physical interval along the length of the track 12 signals the presence of a logical one or a logical zero, respectively.

A conventional transducer or head 20 (shown schematically) reads the dibits from the servo field 10 and the data field 14 on the track 12 over which the head is positioned or writes information to the data fields 14. Generally the information contained in the servo fields 10 should not be overwritten during use of the disk, thereby ensuring the preservation of the servo field information. A conventional actuator arm (not shown) is connected to the head to suspend and position it over the surface of the disk upon which the tracks 12 of information are located. A conventional voice coil motor ("VCM", not shown) is connected to the actuator arm to move the arm and the attached head 20 to locate the head over a selected track 12.

If the information in the servo and data fields is to be written and read in a reliable manner, the head 20 should be positioned over the center line 18 of the track 12. When the head is not located on the center line 18 of the track, there is a greater risk that the information will not be read or written in a reliable manner, and the risk increases with increasing displacement of the head from the center line 18.

A servo system controller (shown in part in FIG. 4) supplies control signals to the VCM to cause it to move the actuator arm and head to the proper track 12 where information is desired to be read or written. Furthermore, the control signals applied to the VCM maintain fine positioning to keep the head 20 centered or located directly over the center line 18. Continuous on-track centering information is obtained by the head 20 reading servo control information encoded within the servo field 14. Using this information, corrections may be achieved in a manner which minimizes transport delay, as described below.

The concept of transport delay is illustrated in FIG. 1 as the time period $t_{td}$. At time $t_0$ a valid measurement of a position error is obtained by reading information from the servo field 10. At time $t_1$ the position error is physically corrected after derivation of an appropriate control signal, application of the control signal to the VCM and stabilized movement of the actuator arm and head 20 to the desired position without overshoot or hunting. The time period $t_{td}$ between $t_0$ and $t_1$ constitutes the transport delay. In the example shown, the time between the subsequent arrival of two sequential servo fields 10 may be $t_{sf}$, and as is apparent, the transport delay $t_{td}$ may constitute a considerable portion of the time $t_{sf}$. During the transport delay time period $t_{td}$ the reliability of the data read or written may be questionable. It is one of the features of the present invention to minimize transport delay.

More details concerning the control information contained in the servo field 10, and the manner in which the servo field control information is used to minimize transport delay are shown in FIG. 2. The servo field 10 includes a number of subfields 24, 26, 28, 30 and 32. These subfields define a preamble 24, a servo address mark ("SAM") 26, a servo synch mark ("SSM") 28, an index mark 30 and a track number code 32. The preamble 24 is a sequence of dibits (pairs of magnetic flux reversals) which delimit the beginning of the servo field 10. The SAM 26 follows the preamble 24 and comprises one or two servo address fields ("SAFs-"none of which are specifically shown) The SAM 26 serves to indicate that a valid servo field 10 has been detected and to signal that the SSM 28 will follow. The SSM 28 is an unique pattern of dibits which is used to establish and maintain synchronization between sequential data and servo fields. The SSM 28 is followed by the index mark 30 which indicates a specific position on the track as a whole, usually with respect to a single defined radial position on the disk. The track number code 32 follows and its magnetic transitions form Gray coded information indicative of an integer value representation of the number of the track currently spanned by the read write head 20.

The information in the subfields 24, 26, 28, 30 and 32 of the servo field 10 is the dibit magnetic transitions recorded in the track 12. The position of these dibits is at the center line 18 of the track 12 and results in the creation of information which is primarily digital when read by the head 20, due to the fact that the magnetic transitions are centered about the center line 18. However, an analog off-track burst subfield 34 creates both a digital and an analog component of the control signal derived by the head 20 as it passes over a first or "A" off-track burst 36, a second or "B" off-track burst 38, a third or "C" off-track burst 40 and a fourth or "D" off-track burst 42. The dibits of the B, C and D bursts 38–42 are located at positions off of or to the side of the track center line 18. When the dibits of the A, B, C and D bursts 36–42 are read by the head 20, four different analog signals result, depending on the physical position of the head 20 relative to the bursts. The analog nature of the signals derived by the bursts 36, 38, 40 and 42 is represented by different heights of the bursts in the subfield 34 shown in FIG. 2.

The dibit patterns of the off-track bursts 36, 38, 40 and 42 are very accurately positioned or written to the disk surface using a laser interferometer, laser positioning system or other suitable technique. The dibit off-track bursts 36, 38, 40 and 42 are located at predetermined locations with respect to the track center line 18, as shown in FIG. 3. Each track includes a C burst 40 and a D burst 42 positioned adjacent to but on opposite sides of the track center line 18. Each track also includes only one A burst 36 or one B burst 38. For example, each track having an even track number may have an A burst 36, while the odd numbered tracks on each side of the even numbered track include a B burst 38. Track center lines 18a and 18b respectively represent the track numbers N−1 and N+1 of the track number N represented by the center line 18. With the alternating occurrence of the A and B bursts 36, 38 on adjacent tracks 18, and the consistent positional relationship of the C and D bursts 40, 42 on each track 18, there is no overlap or conflict in the position of the bursts on the tracks.

The derivation of the different magnitude analog off-track signals by the head 20 reading the bursts 36, 38, 40 and 42 can be understood by reference to FIG. 3. The head 20 is shown positioned directly above the track center line 18 as the off-track servo bursts 36, 38, 40 and 42 approach due to the rotation of the disk. At time $t_A$, the A burst 36 will pass directly beneath head 20. At time $t_B$, the B bursts 38 from the adjacent track center lines 18a and 18b will pass substantially to sides of the head 20. At time $t_c$, the C burst 40 will pass under approximately one-half of head 20, while at time $t_D$, the D burst 42 will also pass beneath approximately the other one-half portion of head 20.

The dibit magnetic reversals of the bursts 36, 38, 40 and 42 induce alternating electrical signals when the head passes over the bursts. The alternating analog signals are then typically amplified, full-wave rectified, peak detected, and sampled and held in a conventional read write channel (not shown). Alternative techniques, such as integration of the detected analog signals, may be utilized in the read write channel rather than full wave rectification and peak detection.

The analog magnitude of the induced signals corresponds to the extent of the influence of the magnetic dibits on the head 20 as the off-track bursts 34 pass under the head 20. The signals derived from the bursts 36, 38, 40 and 42 are essentially related to the amount of area of the bursts which pass directly underneath the head 20. The amplitude sensed from the off-track bursts 34 will be a maximum when the bursts are in the most direct alignment with head 20. For example, since head 20 is in direct alignment with the center line 18, as shown in FIG. 3 at time $t_A$, a maximum amplitude signal will be derived by the head 20 and held by the read write channel from the A burst 36 passing under the head 20. The relatively high amplitude analog signal results because of the maximum interaction of head 20 with the magnetic transitions of the A burst 36 due to the center line 18 alignment of the head 20 over the A burst 36.

Conversely, the complete off-track alignment of the B bursts 38 results in the head 20 sensing little or no signal from the passage of the B bursts 38 at time $t_B$. As head 20 remains on the center line 18, it will derive an approximately half amplitude signal (relative to the maximum signal) at time $t_c$ from the C burst 40 and an approximately half amplitude signal at time $t_D$ from the D burst 42.

If instead of the example shown in FIG. 3, the head 20 was aligned on one of the adjacent odd numbered tracks 18a or 18b, little or no signal would be derived at time $t_A$ because the head 20 would pass to the sides of the A bursts 36, but a maximum signal would be derived at time $t_B$ because the head 20 would pass directly over the B burst 38 on the track center line 18a or 18b. The signals derived at times $t_c$ from the C burst 40 and at time $t_D$ from the D burst 42 would be approximately one half of the value of the maximum value, as was the situation on the even numbered track.

The signals derived from the A, B, C and D bursts 36–42 on each track 18 are sometimes referred to a quadrature signals or quadrature information. Based on the quadrature signals and the track number, an appropriate control signal may be conveniently derived from the appropriate quadrature signals. Derivation of the control signal is based on the largest one of the quadrature burst signals. The following Truth Table summarizes the selection and ordering of the burst signals to obtain the control signal:

| Largest Burst | Truth Table | | | |
| --- | --- | --- | --- | --- |
| | Choose Pair: | U | V | Burst Select Bits |
| A (Channel 0) | C, D | C | D | 00 |
| B (Channel 1) | C, D | D | C | 01 |
| C (Channel 2) | A, B | B | A | 10 |
| D (Channel 3) | A, B | A | B | 11 |

In this Table the selection of the burst signals is ordered such that the V signal will be subtracted from the U signal (U-V) to obtain the control signal. The control signal will have a magnitude linearly related to the amount of the off-track position of the head 20 and will have a positive or negative sign indicative of the direction of movement of the head 20. A negative sign indicates movement is necessary toward a lesser numbered track (N−1) and a positive sign indicates movement is necessary toward a higher numbered track (N+1). The use of this Table to derive the control signal is illustrated from a number of examples discussed below.

When maintaining control of the head 20 on the center line 18 of the even numbered track N, as shown in FIG. 3, the magnitudes of the analog signals derived from the C burst 40 and the D burst 42 are selected for deriving the control signal. The two signals resulting from the C and the D bursts 40, 42 should be almost nearly balanced if the head 20 is over the center line 18, and the difference of the D burst signal from the C burst signal is the control signal. Assume that the head 20 is slightly toward the track N−1, in which case the C burst signal will be slightly larger than the D burst signal. Subtraction of the D burst signal from the C burst signal will result in a positive value. The magnitude of the value represents the degree of control needed to achieve on-track positioning and the positive sign indicates a necessity to move toward a higher numbered track (e.g., N+1) to correct the positioning error. Assume now that the head 20 is slightly toward the track N+1, in which case the D burst signal will be slightly larger than the C burst signal. Subtraction of the D burst signal from the C burst signal will result in a negative value. The magnitude of the value represents the degree of control needed to achieve on-track positioning and the negative sign indicates a necessity to move toward a lower numbered track (e.g., N−1) to correct the positioning error.

A similar position control situation results when maintaining the head 20 on the center line (e.g., 18a) of an odd numbered track (e.g., N−1), as shown in FIG. 3. In this case, the magnitudes of the analog signals derived from the C burst 40 and the D burst 42 are again selected for deriving the control signal, but the ordering of the burst signals is reversed to achieve the proper positive or negative value indicating the movement direction for correcting the position error. Assume that the head 20 is slightly toward the track N, in which case the C burst signal will be slightly larger than the D burst signal. Subtraction of the C burst signal from the D burst signal will result in a negative value, indicating a necessity to move toward a lower numbered track (e.g., N–2, not shown) to correct the positioning error. Assume now that the head is slightly toward the track N–2 (not shown), in which case the D burst signal will be slightly larger than the C burst signal. Subtraction of the C burst signal from the D burst signal will result in a positive value, indicating a necessity to move toward a higher numbered track (e.g. N) to correct the positioning error.

A similar situation occurs for coarse positional corrections. If the head 20 was further displaced, for example, to a position approximately between the two adjacent tracks N and N–1 where a more coarse position correction is required, as shown in FIG. 3, the signal derived from the C burst 40 would be the largest signal. The largest C burst signal results in selecting the A and the B burst signals for control purposes. The A burst signal would be smaller than the B burst signal in this between-track situation because otherwise the C burst signal would not be greater than the A burst signal. The A burst signal is subtracted from the B burst signal. The resulting positive signal moves the head 20 toward a higher numbered track. Once the head 20 moves to a position where the A burst signal is larger than the C burst signal, the previously described situation occurs where the C and D burst signals are used for control purposes.

As another example of coarse position correction, if the head 20 was considerably displaced to a position approximately between the two adjacent tracks N and N+1, as shown in FIG. 3, the signal derived from the D burst 42 would be the largest signal. The largest D burst signal again results in selecting the A and the B burst signals for control purposes. The A burst signal would again be smaller than the B burst signal in this between-track situation because otherwise the D burst signal would not be greater than the A burst signal. The B burst signal is subtracted from the A burst signal. The resulting negative signal moves the head 20 toward a lower numbered track. Once the head 20 moves to a position where the A burst signal is larger than the D burst signal, the previously described control situation occurs using the C and D burst signals for control purposes.

A similar control situation results when the head 20 is in a mid track position between a desired odd numbered track and one of the adjacent even numbered tracks. In each case the A and B burst signals are selected for control purposes and the order of the signals for subtraction (U-V) is selected so the resulting positive and negative value of the control signal moves the head 20 to a position where the C and D burst signals are used for control purposes occurs.

In the situation where the head 20 is located between two track center lines, it is important to recognize the track over which it is desired to position the head 20. The track number information is obtained from the track number code field 32 (FIG. 2) of the servo field 10. This track number information is used by other aspects of the servo system controller to achieve positioning of the head 20 at about the desired track. At this point, the control technique described herein becomes applicable.

It should also be recognized that different patterns and sequences of servo off-track bursts 34 may be employed to detect off-track information other than the above described quadrature control system technique, but the principles described above with respect to the quadrature technique may be adapted to other types of control systems using position defined fields to derive analog signals indicative of the position of the head 20.

To implement the above described quadrature control system technique for positioning the head 20, a burst magnitude comparator 50 is employed, as shown in FIG. 4. The burst magnitude comparator 50 is a part of a servo system controller 52 which is shown partially in FIG. 4. The servo system controller 52 also includes, in pertinent part, an integral digital signal processor, or alternatively, a separate microcontroller or computer (none shown) which accomplishes or supervises overall functional tasks of the servo system controller. An integral digital signal processor, an external microcontroller or an external computer for performing supervisory and control functions is shown in FIG. 4 and is referred to herein as a data processor 53. The data processor 53 accomplishes its tasks by executing separate program instructions written in code. Each instruction performed by the data processor 53 requires time, and the amount of time consumed is related to the number of instructions or lines of code which the data processor 53 must execute. Of course, if many instructions must be executed to achieve positional control, a typical situation in the prior art, the resulting delay will contribute to transport delay. In addition, the execution of position control instructions delays or may prevent the data processor 53 from addressing other control tasks, some of which may be of a critical nature.

In general, one of the significant improvements available from the present invention is to reduce the number of instructions or lines of code (either firmware or software) which must be executed by the data processor 53 for position control, thereby reducing transport delay and freeing the data processor 53 to address more critical tasks. More details concerning the servo system controller 52 and data processor architectures are found in the aforementioned applications which are incorporated by reference herein. As shown in FIG. 4 the data processor 53 communicates information with the servo system controller 52 by communicating signals over a bus 54 to registers of the servo system controller 52, as discussed below and in the incorporated applications.

In general, the function of the burst magnitude comparator 50 is to determine the largest analog signal derived from the quadrature off-track bursts 34 (FIG. 3), select the two signals most appropriate for use in deriving a control signal, and place the selected signals into U and V registers 56 and 58 in the correct order so that the data processor 53 can subtract the two signals to derive a linear control signal of magnitude and sign to obtain the desired direction of movement. By using the burst magnitude comparator 50 to achieve the comparison, selection, ordering and placement functions, the computational processing required by the data processor 53 to achieve position control is greatly diminished. The computational processing involves execution of only a few instructions to simply subtract the V value in V register 58 from the U value in U register 56 to obtain the control signal. Consequently the data processor 53 is freed to execute other tasks associated with the servo system controller 52.

The interaction of the burst magnitude comparator 50 with other portions of the servo system controller 52 is understood from FIG. 4. A plurality of signals 60 from a read write channel (not shown) are supplied to the servo system controller 52. The serially delivered signals from the head 20 are demultiplexed by the read write channel into the plurality of parallel signals 60. By demultiplexing serial signals from the head 20 into the parallel channel signals 60, the circuitry of the read write channel has more time to sample and hold the signals than would otherwise be allowed if the read write channel had to serially process each signal received from the head. The reliability in capturing and holding signals is enhanced by this approach. This approach also allows the signals from the head 20 to occur more frequency than the frequency of conversion of the parallel signals 60 into digital form.

The parallel channel signals 60 are applied to a device 62 which is a combination of a conventional multiplexer ("MUX") and an conventional analog to digital converter ("ADC"). The function of the MUX of the device 62 is to select and apply ones of the signals 60 to the ADC of the device 62, and the function of the ADC is to convert the analog magnitude of each selected signal 60 to digital form and to supply each digital signal on a bus 64. The ADC of the device 62 is an A/D device with calibration circuitry, which is capable of achieving very fast conversions, thereby minimizing transport delay and field length.

The digital signals on the bus 64 are recorded in registers 66 and 68 in the order of the relationship in which they are converted. For example, there are eight signals 60 shown in FIG. 4. Likewise there are eight registers at 66 and 68 to receive the converted digital forms of the eight signals 60.

The operation of the MUX and ADC device 62 is controlled by an analog to digital ("A/D") sequencer 70. The A/D sequencer 70 supplies a signal at 72 to enable operation of the device 62. Channel select signals 74 control the MUX of the device 62 to select the input signal 60 identified by the signals. After converting the selected input signal to digital form, the ADC of the device 62 supplies an end of conversion signal 76 to the A/D sequencer 70. The A/D sequencer 70 further supplies a signal 78 to a servo status register 80. The signal 78 recorded in the servo status register 80 indicates the status of the conversions being undertaken by the device 62 under control of the A/D sequencer 70, and also indicates conditions under which the data processor 53 can interrupt after the conversions have been completed.

The A/D sequencer 70 is controlled both by a servo micro sequencer ("SMS") 82 and by the data processor 53 by signals from an I/O control register 86. The data processor 53 supplies the signals to the I/O control register 86 over the bus 54. In general, the SMS 82 controls the A/D sequencer while the burst information 34 from the servo field 10 (FIGS. 1 and 2) is being converted, and the data processor 53 controls the A/D sequencer 70 by signals from the I/O control register 86 during other times. However, it is possible that the SMS 82 or the data processor 53 may exercise complete control over all functionality, although not simultaneously.

The SMS 82 is preferably a state machine sequencer, as is more fully described in the incorporated U.S. patent application Ser. No. 08/072,135. The SMS 82 supplies start signals at 84 to a MUX 88. The MUX 88 is controlled to supply the signals 84 to the A/D sequencer 70 to allow the SMS 82 to control the conversion of the analog bursts 34 from the servo field 10, without intervention by the data processor 53. After converting the off-track bursts 34, control of the A/D sequencer 70 preferably reverts to the data processor 53.

The data processor 53 controls the A/D sequencer 70 by signals 90 supplied through the MUX 88 from the I/O control register 86. The I/O control register 86 also supplies signals at 92 indicative of the maximum number of convert operations which the SMS 82 is to control and the number of convert operations which is to be controlled by the data processor 53 through the control register 86. After completing the conversions represented by the signal 92, the A/D sequencer 70 supplies a signal at 94 which indicates completion of the conversions. The signal 94 is recorded in the register 86 to indicate that the immediate control over the A/D sequencer 70 has been relinquished to the data processor 53. The signal 94 also controls the MUX 88 to cause it to select the signals 84 from the SMS 82 when the SMS 82 has control over the A/D sequencer 70 and to cause the MUX 88 to select the signals 90 when control over the A/D sequencer is by the data processor 53 through the I/O control register 86.

Additional signals 96 are directly communicated between the MUX and ADC device 62 and the control register 86. The signals 96 achieve calibration of the ADC of the device 62. After the data processor 53 has set the signals in the I/O control register 86, the device 62 recognizes the signals and performs self calibration. After completing the self calibration, the device 62 resets the signal 96 in the register 86. Thereafter the data processor is able to poll or read the I/O control register 86 and determine that the calibration is complete.

All of the registers 56, 58, 66, 68, 80 and 86 are connected to the bus 54 to allow communication of the information contained in the registers to the data processor 53. The information and control signals 90, 92, 94 and 96 are supplied to the I/O control register 86 or the signals are read from the register 86.

The first four signals 60 from the read write channel are derived from reading the off-track bursts 34 (FIG. 2) in the order of the A burst 36, the B burst 38, the C burst 40, and the D burst 42. By delivering the corresponding four off-track signals separately derived from the A, B, C and D bursts 36–42 to the first four channels of MUX of the device 62 in order, the SMS 82 can generate timing control information without assistance from the data processor 53. The timing control information is relative to the detection of the SSM 28 (FIG. 2) as is described in application Ser. No. 08/072,135. This timing information allows calculation of timing information describing when the head 20 should be over and reading the A, B, C and D bursts 36–42. By using this timing control information the sequence of conversions is readily initiated.

To respond to a pre-established sequence of conversions, a number of start convert signals may be delivered to the A/D sequencer 70 and queued. The A/D sequencer 70 includes a counter which recognizes the number of signals to be converted, as represented by the number of queued start convert signals. At the start of the conversion sequence, another counter derives the channel select signal 74 indicative of the signal 60 derived from the A burst 36 at channel 0. At the end of each conversion, the device 62 delivers the end of conversion signal 76. The end of conversion signal decrements the counter of the A/D sequencer 70 by one, and the next channel is selected. This process continues until all of the burst signals have been converted. With each conversion, the device 62 addresses the converted digital value to the appropriate register 66 and 68, in the order in which the conversions occur. Thus the digital values resulting from the conversion of the signals 60 are stored in the registers 66 and 68 in the same order as their conversions. At the conclusion of the conversion of all of the servo field signals, the A/D sequencer 70 delivers the signal 94 to allow the data processor 53 to regain control.

The nature of the sequential operational control of the SMS 82 over the A/D sequencer 70, and over the sample and hold features of the read write channel, are shown in the following chart of exemplary instructions at addresses (ADRs) executed by the SMS 82:

Instruction Chart

| ADR | Instruction Description |
|---|---|
| 0. | Delay for predetermined time |
| 1. | Reset enable SSM Search |
| 2. | Set AGC of ADC |
| 3. | Delay for predetermined time |
| 4. | Set sample A |
| 5. | Delay for predetermined time |
| 6. | Reset Sample A |
| 7. | Start convert Burst A |
| 8. | Delay for predetermined time |
| 9. | Set sample B |
| 10. | Delay for predetermined time |
| 11. | Reset Sample B |
| 12. | Start convert Burst B |
| 13. | Delay for predetermined time |
| 14. | Set sample C |
| 15. | Delay for predetermined time |
| 16. | Reset Sample C |
| 17. | Start convert Burst C |
| 18. | Delay for predetermined time |
| 19. | Set sample D |
| 20. | Delay for predetermined time |
| 21. | Reset Sample D |
| 22. | Start convert Burst D |
| 23. | Delay for predetermined time |
| 40. | Enable SSM search |
| 43. | Branch to zero |

The instructions in the above chart are executed with respect to the detection of the SSM 28 (FIG. 2). Upon detection of the SSM 28, there is a branch to instruction 0 from instruction 43. Instruction 0 establishes a first predetermined time delay. A reset for the next SSM 28 is enabled, the AGC of the read write channel is set, and another predetermined time delay occurs, at instructions 1, 2 and 3, respectively. These time delays and the time for execution of these instructions allow the off-track bursts 34 to move to a position where the head 20 is about to pass over the A burst 36 (FIG. 2). The automatic execution of the instructions 4–23 accomplishes the sequential sampling, holding and conversion of the signals from the A, B, C and D bursts 36–42.

Instructions 4–8 relate to the A burst 36. At instruction 4, channel 0 of the read write channel is enabled to sample the magnitude of the analog signal derived from the A burst 36. Instruction 5 obtains a predetermined time delay to accommodate the sampling function. Instruction 6 terminates the sampling function and results in holding the signal. Instruction 7 results in converting the signal to digital form, and instruction 8 provides a time delay for conversion and delivery of the digital signal to the registers 66.

Similarly, instructions 9–13, instructions 14–18 and instructions 19–23 result in conversion of the B, C and D bursts 38–42 in a pipelined manner. After all the bursts have been converted at the end of the conversion sequence, the A/D sequencer 70 signals at 94 that all of the signals have been converted. The MUX 88 responds to the signal 94 by selecting the signals 90 from the control register 86 to allow the data processor 53 to regain control.

At instruction 40, the SMS 82 is enabled to look for the next SSM 28 (FIG. 2). Upon detection of the SSM 28, the address counter in the A/D sequencer 70 is reset automatically and the SMS 82 regains control and the sequence repeats again.

When the data processor 53 is in control of the A/D sequencer 70, signals supplied through the control register 86 may allow the remaining other four channels of signals 60 to be converted and placed in the registers 68. Examples of these signals include those obtained from the VCM or the spindle motor for controlling the rotation of the disk.

During the conversions controlled by the SMS 82 there is no need to interrupt the data processor 53. The signal 78 is applied from the A/D sequencer 70 to the servo status register 80 during the automatic conversions by the SMS 82, and the information in the register 80 will be read by the data processor 53 to preclude unnecessary interruptions during automatic conversions.

The advantages of this burst magnitude conversion technique is that it is handled automatically and the conversions can occur at the maximum throughput without the necessity of any data processor 53 intervention. The sequencing of conversions through the SMS 82 to the A/D sequencer 70 saves code space in the data processor 53 and insures the very rapid conversions since the device 62 automatically responds to queued signals representative of the analog servo bursts 34 and sequences to the next channel signal 60 without data processor 53 intervention. The selective control over the A/D sequencer 70 allows the SMS 82 to control the regular servo field conversions on a routine basis and thereby relieve the data processor 53 of these control and computational tasks. As a result, the processing resources of the data processor 53 may be applied to other less routine or more critical tasks which might otherwise limit the bandwidth of the disk drive. This minimizes conversion delay and, consequently, transport delay.

More details concerning the burst magnitude comparator 50 are shown in FIG. 5. The digital signals from the register 66 (FIG. 4), which are representative of the signals derived from the A, B, C and D bursts 36–42, are applied at 100, 102, 104 and 106, respectively. The signals at 100 and 102 represent the A and B burst signals, and those signals are applied to the two input terminals of a multibit comparator 108. Similarly, the signals 104 and 106, which represent the magnitude of the C and D burst signals, are applied to the two input terminals of another multibit comparator 110. The function of each comparator 108 and 10 is to select the one of the two input signals applied to it which is greater. In the case of comparator 108, if the signal 100 representing the A burst signal is larger, a driver 112 is activated by a high output signal at 114. If the B burst signal 102 is larger, a driver 116 is activated by the low level signal 114. In a similar manner, the comparator 110 activates the driver 118 with a high level output signal 120 when the C burst signal 104 is larger, and activates the driver 122 by low level output signal 120 when the D burst signal 106 is larger.

The larger one of the A burst signal 100 and the B burst signal 102 is supplied by the activated driver 112 or 116 to one input terminal of another multibit comparator 124. Similarly, the larger of the C burst signal 104 or D burst signal 106 is supplied by the activated driver 118 or 122 to the other input terminal of the comparator 124. The comparator 124 supplies an output signal 126 which represents the largest one of the burst signals 100, 102, 104, and 106. The output signal 126 is applied to a MUX control circuit 128. The control signals 114 and 120 from the comparators 108 and 110, respectively, are also supplied to the MUX control circuit 128.

The function of the MUX control circuit 128 is to implement the Truth Table set forth above. By using the signal 126 representing the largest burst, the MUX control circuit 128 supplies output signals at 130 to a MUX 132 and a MUX 134. The signals 130 from the MUX control circuit 128 correspond to the burst select bits noted in the above identified chart. The burst select bits 130 are recognized by each MUX 132 and 134 as control signals for selecting one of the four input signals 100, 102, 104 and 106 applied to the four input terminals of MUXs 132 and 134. The control signals 130 thereby cause the MUX 132 to supply the one of the signals 100, 102, 104 and 106 into the U register 56 as set forth in the chart above. Likewise, the burst select bit signals 130 cause the MUX 134 to select the appropriate one of the other four signals 100, 102, 104 and 106 to apply in the V register 58 as set forth in the chart above. In this manner, the appropriate pair of burst signals is selected based on the largest magnitude of any one of the four burst signals, and the two selected signals are placed in order in the appropriate U and V registers 56, 58 to allow them to be easily subtracted by the data processor to obtain the desired control signal.

By selecting the appropriate signals, ordering the signals and placing the signals in the U and V registers 56, 58 through use of the hardware functionality of the burst magnitude comparator 50, the data processor 53 need not employ its processing resources to accomplish these functions. The processing required by the data processor 53 is minimal due to the ordering of the signals for subtraction. As a consequence, the time to obtain accurate control signals is reduced, and transport delay is minimized.

The digital logic circuitry for implementing the MUX control circuit 128 in accordance with the truth table set forth in the first chart described above, based on the largest burst signal applied at 126 and the signals 114 and 120 representing the larger one of the A and B burst signals and the larger one of the C and D burst signals respectfully, is implemented in conventional digital logic.

Although the operation of the burst magnitude comparator 50 is automatic and offers the advantages described above, it may not be used if the user desires. To not use the burst magnitude comparator 50, the burst signals from the registers 66 and 68 corresponding to the signals 60 would be read by the data processor 53 over the bus 54, as shown in FIG. 4. The control signal 90 applied to and delivered from the control register 86 would disable the SMS 82 during such operations. Of course when the burst magnitude comparator 50 is disabled, the data processor 53 could then read the contents of registers 66 and 68 to see which of the values representing the analog servo bursts 34 was the largest, which was the smallest, which pair was most balanced, and then, by reference to the track number from which the off-track bursts came (odd or even), decide to subtract the value of one of the analog servo bursts 34 from another. Since such an operation would take many lines of data processor 53 firmware code, which must be stored in memory, and since each instruction would take a finite time to execute, it can be appreciated that the burst magnitude comparator 50 reduces transport delay significantly compared to computational operations achieved by the data processor 53. Increased transport delay may lead to corresponding stability problems such as head 20 "ringing" or "hunting" overshoot, low phase margin and a general lack of system robustness.

The automatic control over the sequencing of conversions from the analog bursts 34 and the automatic selection, ordering and recording functionality of the burst magnitude comparator 50 obtain important improvements in reducing the transport delay in the positioning of the read write head 20 over the track center line 18. In addition more reliable data reading and writing occurs due to the better positioning. Furthermore greater data throughput or bandwidth is obtained because less time is required to obtain the correct positioning before accurate read and write operations can occur. Moreover, the implementation of the burst magnitude comparator 50 in a more hardware efficient and less processing code dependent manner allows the processing resources to be devoted to more critical tasks.

While there have been described above the principles of the present invention in conjunction with specific apparatus, it is to be clearly understood that the foregoing description is made only by way of example and not as a limitation to the scope of the invention.

The invention claimed is:

1. A servo system controller for use with a disk drive of the type having a rotating mass storage disk with information tracks recorded on the disk and a transducer head selectively moveable with respect to the tracks in response to head control signals to perform read and write operations, at least one of the tracks including a servo field containing a predetermined number of bursts each of which is recorded at a predetermined location with respect to a center line of the track, the movement of the bursts relative to the head during rotation of the disk deriving corresponding burst signals that have a magnitude indicative of the position of the head relative to the track center line, the disk drive further including a read write channel which receives burst signals from the head and supplies the burst signals to said servo system controller; said servo system controller comprising:

a data processor to derive head control signals and to apply the head control signals to the disk drive; and a burst magnitude comparator separately connected to the data processor and responsive to the magnitude of the burst signals, the burst magnitude comparator comparing the relative magnitudes of a plurality of the burst signals and selecting at least two of the burst signals based on the comparison of the burst signals and supplying the selected burst signals in a predetermined order for use by the data processor;

the data processor responding to the burst signals in the order supplied to calculate a correction head control signal to use in moving the head toward the track center line.

2. A servo system controller as defined in claim 1 wherein the correction head control signal is obtained by the data processor performing a mathematical calculation on the selected burst signals, and wherein:

the predetermined order in which the burst magnitude comparator supplies the selected burst signals is also established by the comparison of the relative magnitudes of the plurality of the burst signals; and the burst magnitude comparator supplies the selected burst signals in the order in which they will be used in the mathematical calculation.

3. A servo system controller as defined in claim 2 wherein:

the mathematical calculation performed by the data processor is a subtraction;

two selected burst signals are supplied by the burst magnitude comparator; and the predetermined order in which the selected burst signals are supplied by the burst magnitude controller is in a sequence in which subtraction of the supplied burst signals results in a positive or negative value which indicates the direction to move the head toward the track center line.

4. A servo system controller as defined in claim 3 wherein:

the magnitude of the value resulting from the subtraction indicates the amount of head movement required to position the head over the track center line.

5. A servo system controller as defined in claim 2 wherein:

the mathematical calculation performed by the data processor is a subtraction;

two selected burst signals are supplied by the burst magnitude comparator in sequence for subtraction; and the data processor subtracts one of the two selected burst signals supplied second in the predetermined order by the burst magnitude comparator from one of the two selected burst signals supplied first in the predetermined order by the burst magnitude comparator.

6. A servo system controller as defined in claim 2 wherein:

two selected burst signals are supplied by the burst magnitude comparator; and further comprising:

registers to record the two selected burst signals supplied by the burst magnitude comparator; and wherein:

the data processor reads the signals recorded in the registers in an order which is employed to accomplish the subtraction.

7. A servo system controller as defined in claim 2 wherein:

the data processor accomplishes other control functions for said servo system controller;

the burst magnitude comparator operates without control from the data processor; and the data processor accomplishes the other control functions while the burst magnitude controller selects and supplies the selected burst signals in the predetermined order.

8. A servo system controller as defined in claim 1 wherein the disk drive is further of the type in which the burst signals derived from the head are analog signals having magnitudes indicative of the position of the head relative to the track center line; and said servo system controller further comprising:

an analog to digital converter receptive of the analog burst signals for converting the analog burst signals to digital burst signals;

a sequencer connected to the converter for controlling the converter to convert each of the analog burst signals in the sequence in which the burst signals are received from the head; and wherein:

the data processor performs other control functions for the servo system controller in addition to the mathematical calculation to obtain the correction head control signal;

the sequencer operates without intervention by the data processor while the data processor accomplishes the other control functions; and the burst magnitude comparator supplies digital burst signals as the selected burst signals for use by the data processor.

9. A servo system controller as defined in claim 8 further comprising:

a plurality of converted signal registers connected to the data processor, the burst magnitude comparator and the converter; and wherein:

the converter records the digital burst signals in the converted signal registers; and the burst magnitude comparator reads the digital burst signals from the converted signal registers prior to selecting and supplying the selected burst signals to the data processor.

10. A servo system controller as defined in claim 8 wherein:

the sequencer executes a series of instructions in response to the head deriving a synch mark signal from a predetermined synchronization mark in the servo field; and at least one of the instructions causes a predetermined time delay before executing the next instruction.

11. A servo system controller as defined in claim 10 wherein the disk drive is further of the type in which the read write channel converts the successive burst signals into parallel burst signals applied in a predetermined parallel order related to the order of succession in which the burst signals are derived; said servo system controller further comprising:

a multiplexer connected to the converter and receptive of the parallel burst signals from the read write channel; and wherein:

the sequencer supplies channel select signals to the multiplexer; and the multiplexer responds to the channel select signals to select the parallel burst signals from the read write channel for application to the converter in the order in which the corresponding sequential burst signals from the head are derived.

12. A servo system controller as defined in claim 11 wherein:

the sequential burst signals from the head occur more frequently than the frequency at which the converter converts the parallel analog burst signals to digital burst signals.

13. A servo system controller as defined in claim 11 wherein:

the converter supplies an end of convert signal after completion of each conversion of one analog burst signal to a digital burst signal; and the sequencer supplies the next channel select signal in response to the end of conversion signal.

14. A servo system controller as defined in claim 13 wherein:

the sequencer includes a servo sequencer which executes the instructions and supplies servo sequencer control signals related to the instructions executed;

the sequencer also includes an analog to digital sequencer which controls the multiplexer and the converter in response to the servo sequencer control signals;

the converter supplies the end of convert signal to the analog to digital sequencer;

the analog to digital sequencer supplies the channel select signals to the multiplexer in response to the end of convert signals.

15. A servo system controller as defined in claim 14 wherein:

the servo sequencer executes the series of instructions without interruption from the data processor.

16. A servo system controller as defined in claim 14 further comprising:

a control register in which to store data processor control signals, the data processor control signals including a maximum number control signal representative of the maximum number of parallel burst signals to be converted; and wherein:

the data processor supplies the maximum number control signal to the control register; and the analog to digital sequencer is connected to the control register and responds to the maximum number control signal and to the servo sequencer control signals to terminate further operation of the multiplexer and the converter when the number of conversions executed under control of the servo sequencer obtains a predetermined relationship to the maximum number control signal.

17. A servo system controller as defined in claim 16 wherein:

the data processor control signals in the control register include ones which cause the analog to digital sequencer to control the multiplexer and converter during conversion of the analog signals derived other than from the bursts; and the analog to digital sequencer is controlled by the servo sequencer control signals from the servo sequencer during conversion of the analog signals from the bursts and is controlled by the data processor control signals from the control register during conversion of analog signals other than the analog burst signals.

18. A servo system controller as defined in claim 16 further comprising:

a control signal multiplexer connected to the servo sequencer and the control register for supplying servo control signals to the analog to digital sequencer during conversion of the analog burst signals and for supplying data processor control signals to the analog to digital sequencer during the conversion of analog signals other than the analog burst signals.

19. A servo system controller as defined in claim 1 wherein the disk drive is further of the type in which the head also supplies analog signals derived from information in the track other than the bursts, and in which the burst signals derived by the head are analog signals having magnitudes indicative of the position of the head relative to the track center line; said servo system controller further comprising:

an analog to digital converter receptive of the analog signals derived by the head for converting the analog signals to digital signals;

a servo sequencer which executes servo instructions; and wherein:

the data processor performs control functions for the servo system controller other than the calculation of the correction head control signal;

the converter is selectively connectable to either the servo sequencer or the data processor; and the one of the sequencer or the data processor to which the converter is connected controls the converter.

20. A servo system controller as defined in claim 19 wherein:

the servo sequencer supplies servo control signals related to the servo instructions executed;

the data processor supplies data processor control signals when performing the other control functions;

the converter is controlled from the servo control signals during conversion of the analog burst signals and is controlled from the data processor control signals during conversion of analog signals other than the analog burst signals; and the servo sequencer operates without interruption by the data processor while executing the servo instructions.

21. A servo system controller as defined in claim 19 wherein the disk drive is of the type in which the read write channel supplies the analog signals from the head in parallel form, and wherein:

the converter receives parallel analog signal from the read write channel;

the converter converts the parallel analog signals in a predetermined order at a predetermined maximum frequency of conversion; and the sequential analog signals from the head occur more frequently than the predetermined maximum frequency of conversion.

22. A servo system controller as defined in claim 1 wherein the servo field includes an A burst recorded on the center of the track center line, a B burst which is recorded on the center of an adjacent track center line, a C burst which is recorded to one side of the track center line toward a lesser numbered adjacent track and a D burst recorded on the other side of the track center line toward a greater numbered adjacent track; and wherein:

the burst magnitude comparator selects the signals derived from the C burst and the D burst as the selected burst signals if either one of the signals derived from the A burst or the B burst is the largest of all of the burst signals; and the burst magnitude comparator selects the signals derived from the A burst and the B burst as the selected burst signals if either one of the signals derived from the C burst or the D burst is the largest of all of the burst signals.

23. A servo system controller as defined in claim 22 wherein:

the calculation of the correction head control signal is a mathematical subtraction;

the burst magnitude comparator supplies the signal derived from the D burst in the predetermined order to be subtracted from the signal derived from the C burst when the signal derived from the A burst is the largest of all of the burst signals;

the burst magnitude comparator supplies the signal derived from the C burst in the predetermined order to be subtracted from the signal derived from the D burst when the signal derived from the B burst is the largest of all of the burst signals;

the burst magnitude comparator supplies the signal derived from the A burst in the predetermined order to be subtracted from the signal derived from the B burst when the signal derived from the C burst is the largest of all of the burst signals; and the burst magnitude comparator supplies the signal derived from the B burst in the predetermined order to be subtracted from the signal derived from the A burst when the signal derived from the D burst is the largest of all of the burst signals.

24. A servo system controller as defined in claim 1 further comprising:

a plurality of selected signal registers connected to the data processor and to the burst magnitude comparator; and wherein:

the burst magnitude comparator supplies the selected burst signals for use by the data processor by recording the selected burst signals in the selected signal registers;

the data processor receives the burst signals selected by the burst magnitude comparator by reading the selected burst signals from the selected signal registers;

the burst magnitude comparator supplies the selected burst signals to the selected signal registers and records the selected burst signals in the selected signal registers independently of control by the data processor; and the data processor reads the selected burst signals from the selected signal registers and calculates the correction head control signal from the selected burst signals read from the registers.

\* \* \* \* \*